United States Patent [19]

Luik

[11] 4,288,777
[45] Sep. 8, 1981

[54] PARKING AID

[76] Inventor: Manfred Luik, Ulmer Str. 18, 7250 Leonberg, Fed. Rep. of Germany

[21] Appl. No.: 56,103

[22] Filed: Jul. 9, 1979

[30] Foreign Application Priority Data

Jul. 12, 1978 [DE] Fed. Rep. of Germany ....... 2830604
Jan. 8, 1979 [DE] Fed. Rep. of Germany ....... 2900489

[51] Int. Cl.³ .................. G08G 1/14; H01H 3/16; H01H 19/00
[52] U.S. Cl. ...................................... 340/51; 340/61; 200/61.41; 200/61.49; 200/22; 200/23; 200/25
[58] Field of Search ................... 340/51, 52 H, 56, 61, 340/683, 686; 200/61.41, 61.42, 61.43, 61.44, 61.49, 61.53, 61.72, 61.73, 61.74, 61.81, 22, 23, 25, 31 R, 51.03, 51.04, 51.05, 51.06, 51.07; 116/28 A, 28 R

[56] References Cited

U.S. PATENT DOCUMENTS

| | | | |
|---|---|---|---|
| 2,454,896 | 11/1948 | Traub | 340/61 |
| 3,219,972 | 11/1965 | Williams | 340/61 |
| 3,820,065 | 6/1974 | Koplewicz et al. | 340/51 |
| 3,835,279 | 9/1974 | Andreas | 200/61.41 |
| 3,922,638 | 11/1975 | Mendelsohn | 340/51 |
| 4,101,868 | 7/1978 | Bubnich et al. | 340/51 |
| 4,145,681 | 3/1979 | Bubnich et al. | 340/51 |

FOREIGN PATENT DOCUMENTS

| | | | |
|---|---|---|---|
| 7736527 | 3/1978 | Fed. Rep. of Germany | 340/51 |
| 7737528 | 5/1978 | Fed. Rep. of Germany | 340/51 |

Primary Examiner—John W. Caldwell, Sr.
Assistant Examiner—Donnie L. Crosland
Attorney, Agent, or Firm—Michael J. Striker

[57] ABSTRACT

A parking aid generates a signal when a vehicle approaches an obstacle, e.g., a garage wall, on which the parking aid is mounted. The distance of the vehicle to the obstacle, at which the aid will produce the optical and/or acoustical signal, can be adjustable or fixed.

17 Claims, 6 Drawing Figures

PARKING AID

BACKGROUND OF THE INVENTION

The present invention relates to a parking aid for vehicles, and more particularly to a parking aid for vehicles approaching an obstacle such as the wall of a garage or the like.

More particularly, the invention relates to a signal-generating parking aid of the type in question.

When a vehicle approaches a stationary obstacle, for example the wall of a garage or the like, there is often the problem of determining just when to stop the vehicle so that it will not contact the obstacle. This problem is particularly acute if the vehicle is backing up, but often also exists if the vehicle moves forwardly because the shape of the hood, a protruding front bumper or some similar problem may make it impossible for the operator to determine from the front seat whether the vehicle is about to contact the obstacle. It has been proposed, for example in German Gebrauchsmuster No. 77 36 527, to mount in front of a garage wall a horizontal plank by means of telescopable supports and to arrange a switch in the path of the plank which recedes on its telescopable supports when pushed by the approaching vehicle. When the switch is closed by engagement with the plank an optical signal is generated to warn the driver that the vechicle must be stopped to avoid contact with the garage wall. However, the plank can recede from the vehicle only to a limited extent and the driver cannot instantaneously stop the vehicle when the signal light comes on. The result is that due to the time lost between energization of the signal light and activation of the vehicle brake by the driver, and the inertia of the vehicle which must be overcome before it comes to a full stop, the plank is fully pressed throughout its entire path of resiliency and is pushed up against its abutment so that there is still a rather strong impact before the vehicle comes to a stop. A rubber strip mounted on the plank can mitigate this problem to some extent, but cannot entirely avoid it. Moreover, one of the contacts of the switch is a stiff length of wire which hangs down behind the plank and is engaged by the plank as the same recedes from a contacting vehicle; this length of wire is deformed each time the arrangement operates and there is therefore no guarantee of reliable operation from instance to instance. Also, if the driver should happen to be inattentive or distracted there is the danger that the plank, the contact, the vehicle and under some circumstances even the wall behind the plank, may become damaged by too hard an impact. Finally, the plank must always be mounted and adjusted in such a way that it is exactly located at the level of the vehicle bumper, which is not only somewhat tedious but also prevents reliable operation of the arrangement in circumstances in which different vehicles use the same parking location.

Another approach, suggested in German Gebrauchsmuster No. 77 37 528, proposes the use of a rod the lower end of which is connected relatively close to the floor and which extends upwardly parallel to the wall, carrying at its upper end a disk. This arrangment relies upon the fact that when the rod is contacted by an approaching vehicle it will start to vibrate or oscillate so that the moving disk constitutes a signal for the vehicle operator. However, here as in the preceding construction the time between the moment at which the disk begins to oscillate and the time at which the vehicle contacts the wall, is too small to effectively and under all circumstances prevent the possibility of damage to the vehicle, the indicator rod and/or the wall.

SUMMARY OF THE INVENTION

Accordingly, it is an object of the present invention to avoid the disadvantages of the prior art.

More particularly, it is an object of this invention to provide an improved parking aid for vehicles approaching an obstacle, such as a wall of a garage, wherein the drawbacks of the prior art are avoided.

Another object of the invention is to provide such an improved parking aid which is simple in its construction and suitable for universal use, i.e. suitable for use with all types of vehicles.

In keeping with the above objects and with others which will become apparent hereafter, one feature of the invention resides in a parking aid for vehicles approaching an obstacle, particularly a wall of a garage. Briefly stated, the parking aid may comprise signal generating means, and actuating means operatively connected with the signal generating means to trigger the same when contacted by an approaching vehicle. The actuating means may comprise a resiliently mounted contact member adjacent to the obstacle and coupled with the signal generating means, a feeler member having an upper part extending outwardly from the obstacle and a lower part extending downwardly from the upper part, and resilient means yieldably connecting the upper part of the feeler member to the contact member.

Because the feeler member is yieldably connected to the contact member it can yield relative to the contact member to a certain extent, so that the forces acting upon the contact member are rather small and, by proper selection of the resilient means (usually a spring) can be made just large enough to trigger the signal generating means, i.e. to close a contact. Due to its resilient mounting and its generally angular shape the feeler member yields laterally to pressure of an approaching vehicle so that it does not transmit any significant forces from the vehicle to the spring, i.e. the resilient means mounting it to the contact member. Due to this construction the feeler member can travel through a rather lengthy path without any significant increase in the pressure acting upon the contact member, so that the signal can be generated very early (i.e. immediately upon or very soon after engagement of the feeler member by the vehicle), which gives the vehicle operator adequate time to stop the vehicle and to avoid contact of the vehicle with the wall. Even if he does not manage to stop the vehicle in time and therefore presses the feeler member against the wall or other obstacle which the arrangement is mounted, the contact member itself will not become damaged by this and therefore the arrangement remains reliably operative for providing a signal the next time a vehicle approaches the obstacle.

The signal generated by the signal generating means may be acoustical (e.g. a buzzer, a bell or the like) or it may be optical. In the latter case it is advisable to provide the parking aid with a housing in which the contact member, the optical signal generating means (a lamp, flash tube or the like) and also the source of electrical energy are all mounted jointly, with the housing being mounted approximately at the eye level of the operator of an approaching vehicle. The feeler member must of course extend far enough downwardly so that it will be reliably engaged by the bumpers of all types of vehicles expected to use the parking space provided with the parking aid, i.e. irrespective of whether the bumpers on the vehicles are mounted high or low. An acoustical signal generator may also be mounted in such a common housing, but is may instead be mounted at any other desired location and need not be located in or close to the line of sight of the vehicle operator. For an acoustical signal generator a location laterally of the parking site may even be preferable, because the signal generated can be heard more readily by the operator.

An arrangement as just outlined above will of course operate only through a fixed distance of vehicle to obstacle, i.e. it will trigger the signal only when the vehicle is spaced from the obstacle by a preselected distance. To change this distance it would be necessary to replace the feeler member with a differently shaped and/or dimensioned feeler member, or to make it of several parts of which some can be exchanged for others having different shapes and/or dimensions. This is, of course, not very practical because the parking aid according to the present invention should be suitable for use in different types of vehicles, in different types of locations, and should be able to warn drivers having different personalities, i.e. drivers who react differently to the same signal. Rather than to provide for replacement or adjustment of the feeler member the invention therefore proposes a varying arrangement which permits an adjustment of the degree of deflection (from normal feeler member position) at which the signal generating means will become triggered.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
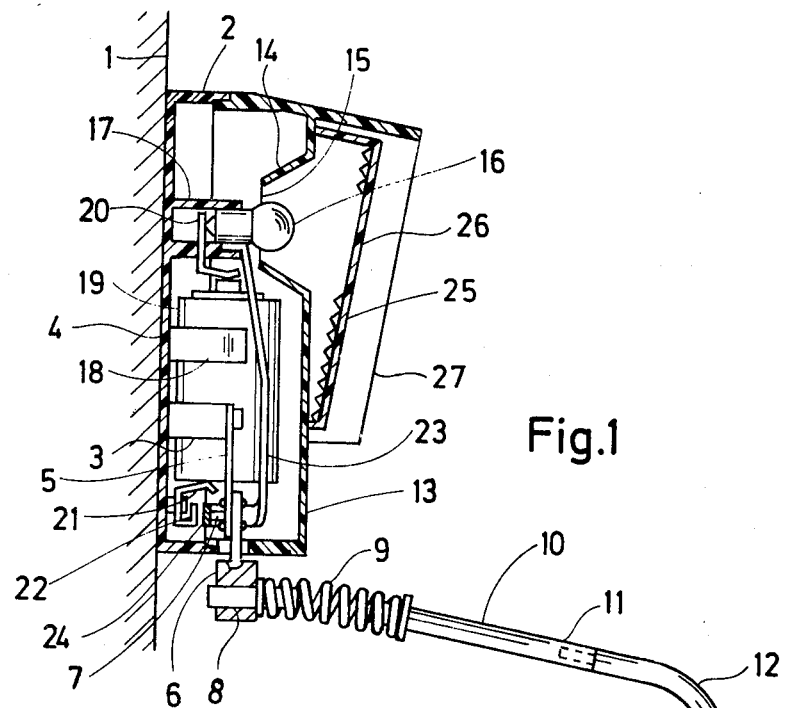
FIG. 1 is a side view, partly in sectional elevation, of one embodiment of the invention.
Figure 2:
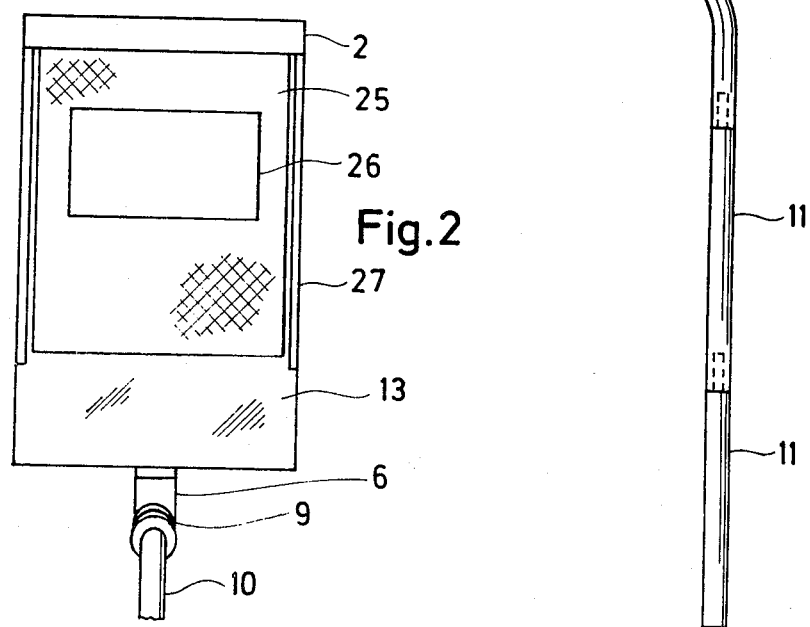
FIG. 2 is a front view of FIG. 1, looking from right to left in FIG. 1.

Referring now to the drawing in detail, and firstly to the embodiment in FIGS. 1 and 2, it will be seen that this embodiment has a housing 2 of electrically insulating material (e.g. synthetic plastic material) which is mounted on a stationary obstacle, such as the wall 1 of a garage. The housing 2 is preferably located at the eye level of the driver of an approaching vehicle and is provided with a rear wall 4 on a boss 3 of which a substantially vertically oriented leaf spring 5 is mounted. The lower end of the leaf spring 5 carries a contact member 6 which may be riveted or otherwise secured to it. The contact member 6 carries a pin 7 which is located within the housing 2 and has a portion extending outside the housing 2 through an opening in the same; this portion carries an approximately horizontally extending pin or bolt 8 on one end of which is mounted a helical spring 9. Inserted into the other end of the helical spring 9 is one end of a rod-like feeler member 10 which in the illustrated embodiment is composed of straight parts 11 and and elbow-shaped part 12 which may be telescoped together, threaded together or otherwise secured together. Depending upon the desired dimensions one, two or more of the straight parts 11 may be inserted above and/or below the elbow part 12.

The housing 2 has a removable front wall 13 which is plate-shaped in the illustrated embodiment and is in part constructed as a retroreflector 14. The reflector is provided with a center opening 15 through which a light bulb 16 extends which is secured in a socket 17 of the rear wall 4. Also mounted on the rear wall 4, by means of elastic grippers 18, is a source of electrical energy, here in form of a dry cell 19. A contact strip 20 engages the upper (positive) pole of the dry cell 19 and has a portion extending into the socket 17 where it engages the rear contact of the light bulb 16. The opposite (negative) pole of the dry cell 17 engages a second contact strip 21, the end of which that is remote from the dry cell forms a switching contact 22. Another contact strip 23 engages the lateral contact of the light bulb 16 in the socket 17 and has at its lower end a further switching contact 24 (its lower end is shaped to form this contact) which is located between the contact strip 21 and the pin 7.

A plate 25 is mounted ahead of a part of the front wall 13 and a part of its surface is constructed as a retroreflector. However, that part of the plate 25 which is located in front of the light bulb 16 and the reflector 14, forms a light-permeable window 26. Stray light is excluded by a frame 27 which surrounds the plate 25 at the top end laterally and is formed as part of the front wall 13, extending forwardly of the plate 26 so as to assure that the light of the bulb 16 can be readily discerned.

The helical spring 9 is so constructed and dimensioned that it can transmit from the feeler member 10-12 to the contact member 8 a force which is sufficiently strong to deflect the spring 5 with the contact member so that the contacts 22 and 24 can engage one another, but that it will yield and fold up if stronger forces than the ones just mentioned act upon the feeler member 10-12.

In the position illustrated in FIGS. 1 and 2 no electrical current is being supplied to the light bulb 16. This, therefore, is the rest position of the device. If now a vehicle (approaching from the right in FIG. 1) pushes against the vertical part of the feeler member 10-12, then the feeler member performs a yielding movement which is a composite of a movement towards the wall 1 (to the left in FIG. 1) and laterally in general parallelism with the wall 1 (substantially normal to the plane of FIG. 1). Such movement suffices to displace the lower end of the contact member 6 towards the wall 1, causing the pin 7 to press the contact 22 against the contact 21, so that the contacts 22 and 24 engage one another, closing the electrical circuit which energizes the light bulb 16. The resulting signal tells the vehicle operator that he has reached the foremost permissible position. He now stops the vehicle and reverses it slightly until the light bulb becomes extinguished again, whereby he is assured that he is in the proper parking position. During the forward movement of the vehicle which follows the initial engagement with the feeler member 10-12 the feeler member yields largely in lateral direction, except for the initial yielding movement towards the wall 1. Thus, the feeler member need not absorb and withstand the force of the vehicle and is thereby protected against damage. Moreover, the contact member 6 is itself relieved of excessive forces which might damage it even if the feeler member 10-12 is pressed far enough forwards by the vehicle to contact the wall 1. The spring 9, on the other hand, will always offer sufficient resistance to such yielding of the feeler member 10-12 that the reliable production of a signal by the bulb 16 (due to energization of the same) is assured. The retroreflecting part of the plate 23 draws the attention of the vehicle operator to the arrangment if the lights of the vehicle are on and provides an approximate gage to the driver for the distance of the vehicle to the wall. On the other hand, energization of the bulb 16 is clearly visible because of the presence of the light-transmissive (i.e. transparent or translucent) window 26.

Figure 3:
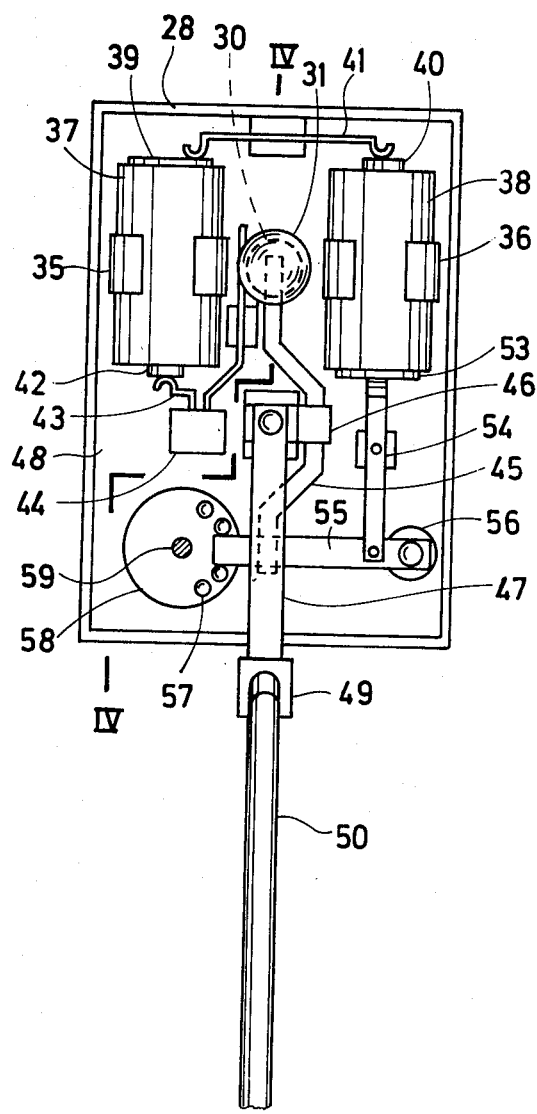
FIG. 3 is a view similar to FIG. 2, but illustrating a lesser embodiment of the invention and with the front cover of the housing removed to show the interior.
Figure 4:
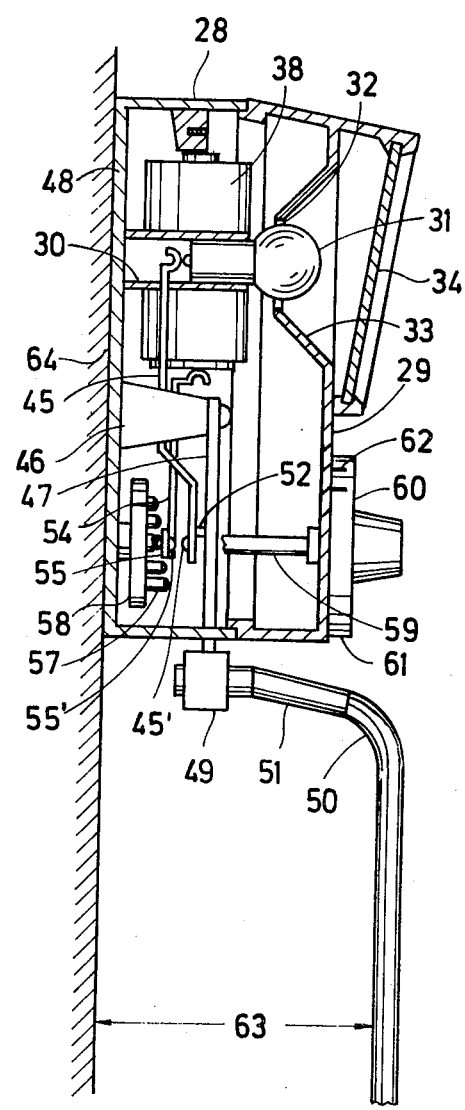
FIG. 4 is a section on line IV—IV of FIG. 3.

In the embodiment of FIGS. 3 and 4 the parking aid according to the invention has a housing 28 which is again preferably of synthetic plastic material but may also be of some other material and which has a detachable front wall 29. A light bulb 31 is secured in a socket 30 and extends through an opening 32 into a reflector 33 which is integrated in the front wall 29 and in front of which there is mounted a red light-transmitting plate 34 (e.g. of synthetic plastic material) which is formed with prismatic embossments or the like. Two batteries 37 and 38 are located in holders 35, 36 at opposite sides of the socket 30 so as to extend parallel to one another. The battery 37 has its negative pole 39 facing upwards and the battery 38 has its positive pole 40 facing upwards, and the poles 39 and 40 are connected by an electrically conductive contact bridge 41. The other poles 42 and 53 of the batteries are also connected; namely a conductor strip 43 extends from the pole 42 of the battery 36 via a timing device 44 to the socket 30 where it engages a lateral pole of the bulb 31, whereas the rearward pole of the bulb 31 is engaged by a contact strip 45 which extends downwardly and is mounted in a support 46 on which one end of an elastically yieldable member 47 is secured. The support 46 is mounted on the rear wall 48 of the housing 28. The member 46 extends with its lower end out of the housing 28 and has a portion 49 by means of which a rod 50 is coupled to it. The rod 50 has an elastically yieldable part 51 and is bent downwardly in a substantial L-shape. The lower end of the contact strip 45 springilly engages immediately below the member 47 with a pin 52 mounted on the member 47 and consisting of an electrically insulating material, e.g. synthetic plastic material.

A conductor strip 54 extends from the pole 53 of the battery 38 to a second conductor strip 55 which is connected with one end to a boss 56 of the rear wall 48, whereas its other end extends underneath the contact strip 45 and has a contact 55' which in operation is stationary. A disk 58 is mounted on a shaft 59 extending parallel or substantially parallel to the direction of movement of the movable contact 45 and is provided with a plurality of axially projecting pins or projections 57 which are arranged circumferencially spaced on the disk 58 and successive ones of which are of different axial lengths. Contact 55' elastically yieldably engages the respective projections 57 which have at their free ends rounded surfaces so as to be able to slide more readily over the contact 55' when the disk 58 is turned on or about the shaft 59. The front end of the shaft 59 extends through the front wall 29 and carries a knob 60 having a flange 61 provided with markings 62 which indicate to a user particular angular positions of the disk 58 and thus make it possible to reproduce different settings if and when desired, simply by turning the disk 58 until a respective one of the projections 57 engages the contact 55', so that depending upon the length of the particular projection 57 moved into such engagement, the distance between the movable and stationary contacts 55', 45' can be varied, and thus the time interval between first contact of the vehicle with the rod 50 and the energization of the signal generating means is varied.

One of the markings 62 (this one is not shown) on the knob 60 may be designated "test". If the knob is turned so that this "test" marking is located opposite a cooperating mark on the front wall 29 of the housing, then the longest one of the projections 57 will move beneath the contact 55' and force the same into engagement with the contact 45' of the strip 45, so that the electrical circuit for the bulb 30 is closed and the same becomes energized. This, therefore, is a test arrangement which permits the device to be tested; if the bulb 30 fails to become energized, then this is an indication that the bulb is defective, the batteries exhausted and/or other parts of the arrangements are defective or are malfunctioning. In every other angular position of the knob 60 and consequently the disk 58 a respective one of the other pins 57 displaces the contact 55' towards the contact 45 to greater or lesser degree, thereby varying the distance between the contacts as mentioned before.

If a vehicle approaching the wall 1 engages the rod 50, such engagement will take place while the rod 50 is spaced from the wall 64 by a predetermined distance, for example a distance 63 (FIG. 4). If the vehicle approaches the wall more closely, then the rod 50 yields resiliently and in so doing bends the member 47 rearwardly until the contact strip 45 and the movable contact 45' engages the stationary contact 55' and closes the circuit which energizes the bulb 31. The distance at which this takes place is determined by the angular position of the disk 58 and the length of the particular pin 57 engaging and supporting the stationary contact 55'.

After a certain time (chosen to permit braking of the vehicle) has elapsed subsequent to energization of the bulb 30, the timing device 44 operates to interrupt the electrical circuit to the bulb. The circuit is closed again only after the contact strips 45 and 55 have moved apart, thereby assuring that there is no excessive and premature drain on the batteries 37 and 38.

After the device has been mounted on the wall or other obstacle 64 the driver of the vehicle can first try out (by turning the knob 60) to what angular position the disk 58 must be set to assure that, when the member 50 is depressed by the approaching vehicle, the device will produce a signal early enough to allow the vehicle to come to a stop in the proper parking position and out of contact with the wall 64. Once set, the device will operate to produce a signal every time when a vehicle has approached the wall 64 to a predetermined extent. The setting can, however, be changed by merely turning the knob 60 and thereby the disk 58 to a different position. This may be done, for example, when a different vehicle is to be parked repeatedly at the spot where the other vehicle was previously parked or if a different driver prefers a different setting. The angular positions of the disk 58 may be secured by providing detents or other means. For example, the end of the contact strip 55 may have a dimple or depression into which the free ends of the pins 58 can snap.

The timing device 44 can be omitted if desired. In that case the driver must, subsequent to energization of the bulb 30, reverse his vehicle until the bulb becomes deenergized again. This is of particular advantage if and when there is sufficient space to reverse the vehicle or in circumstances where readjustment is infrequent.

The disk 58 can be replaced with another arrangement, for example with an axial cam in which the cam surface continuously varies (i.e. increases or decreases in dependence upon the direction of turning of the cam) lengthwise of the axis of shaft 59. Otherwise the arrangement will be the same, i.e. the cam would be mounted for rotation on the shaft 59 just the same as the disk 58 is mounted. Still other arrangements are possible and are intended to be included herein. Other parts of the arrangement may also be varied within the concept of the invention. For example, the member 50 may be constructed as an upright plank, a bracket or any other type of member that can be engaged and moved by an approaching vehicle.

In lieu of an optical signal furnished by a light bulb the device may also produce an acoustical signal, in which case the light bulb will be replaced with a buzzer, a beeper, a bell or other analogous device which is mounted either in the housing 28 or at another location.

Figure 5:
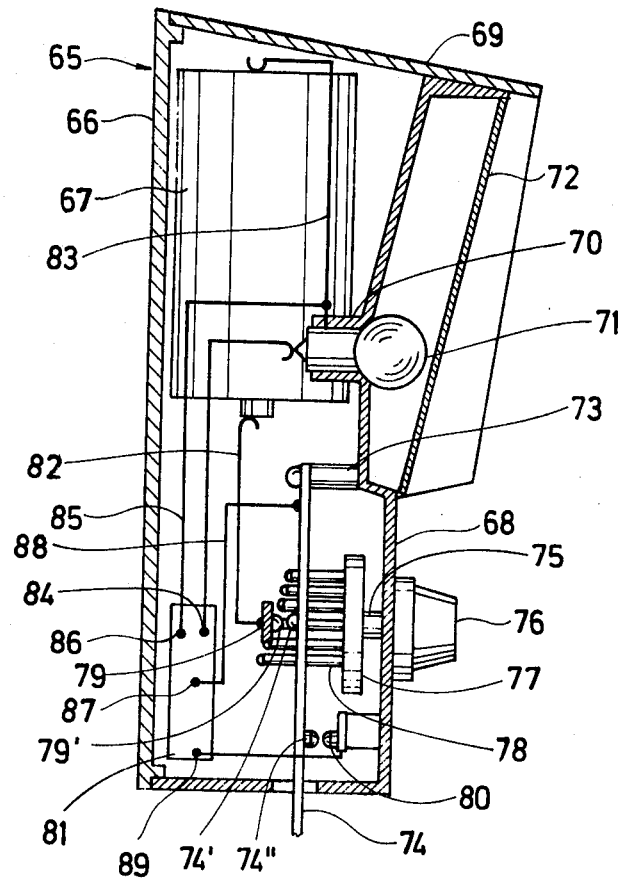
FIG. 5 is a view similar to FIG. 4, but illustrating a further embodiment of the invention in a somewhat simplified form.

The embodiment illustrated in FIG. 5 has a housing 65 on the rear wall 66 of which two batteries 67 are mounted. The front wall 68 of the housing 65 is connected with a hood 69 and surrounds the elements in the interior of the housing. The front wall has a socket 70 for a light bulb 71 in front of which there is mounted a e.g. red fuser plate 72. Boss 73 of the front wall 68 carries an elastically yieldable member 74, the (not illustrated) lower end of which again has a feeler member (not illustrated) similar to those illustrated in the preceding embodiments.

A shaft 75 is turnably mounted in the front wall 68 and has an outer free end on which a knob 76 is mounted. The inner end of the shaft 75 carries a disk 77 from which again a plurality of angular spaced pins or projections 78 extend which correspond to the pins or projections 57 of the embodiment in FIGS. 3 and 4 and serve the same purpose as those, but here with respect to an elastic contact strip 79. The contact strip 79 carries a stationary contact 79' and the member 74 carries two movable contacts 74' and 74". A contact 80 mounted on the front wall 68 cooperates with the contact 74". Also mounted in the housing 75 is a control unit 81.

Figure 6:
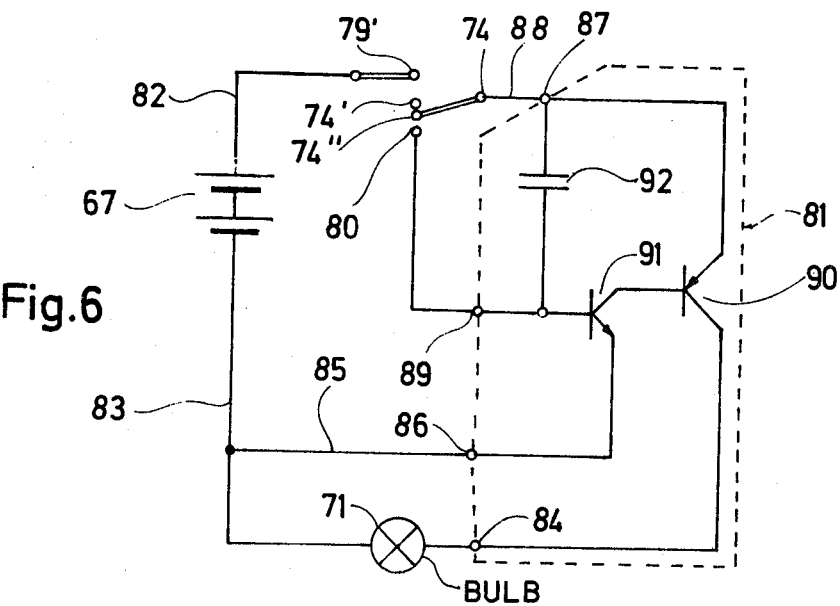
FIG. 6 is a circuit diagram of the embodiment of FIG. 5.

As reference to FIG. 6 shows, a conductor 82 extends from one pole of the series-connected batteries 67 to the adjustable stationary contact 79'. Another conductor 83 leads from the other pole to a contact of the light bulb 71, the other contact of which is connected to a terminal 84 of the unit 81. A conductor 85 extends from the conductor 83 to another terminal 86 of the unit 81. A conductor 88 extends from a further terminal 87 of the unit 81 to the member 74 having the contact 74' and 74", and a terminal 89 of the unit 81 is connected with the contact 80.

The terminals 84 and 87 are connected in the unit 81 via the emitter and collector of the transistor 90, the base of which is connected with the terminal 86 via the emitter-collector circuit of a second transistor 91. The base of transistor 91 is connected to terminal 89 and via a capacitor 92 to the terminal 87.

In the embodiment of FIGS. 5 and 6, as in the preceding embodiment, turning of the knob 76 causes the rest position of the contact 79' with reference to the movable contact to be adjusted, whereby an adjustment is made of the distance of the feeler member from the obstacle at which the arrangement becomes energized. When a vehicle engages the feeler member, which is here not illustrated, it displaces the same and thereby the member 74 until the contact 74' engages the contact 79', whereby the bulb 71 is energized via the conductor 83, the terminal 84, transistor 90, terminal 87 and conductor 82. At the same time the capacitor 92 begins to be charged which takes a predetermined amount of time, i.e. 10 seconds. When the charging is terminated the transistor is blocked and the bulb 71 becomes deenergized. The deenergization is desirable because the vehicle is usually left in the position which it has reached at the time the bulb 71 originally becomes energized, or which it reaches shortly thereafter. If, however, the vehicle is backed up, then the contacts 79' and 74' disengage from one another, and the member 74 is allowed to return to its normal rest position in which the contact 74" engages the contact 80. This causes a discharge of the capacitor 92 so that the bulb 71 can immediately become re-energized if the vehicle should move forwardly again and cause a renewed operation of the device. This is necessary in the event the driver allows the vehicle to roll back intentionally or unintentionally after the bulb initially becomes energized, but then wishes to return to his original position. This rapid discharge (shorting) of the capacitor 92 is necessary via the contact 80, because otherwise the bulb 71 could become re-energized only after the capacitor is discharged in some other manner which will take a longer period of time and, in the event the driver moves the vehicle forwardly again might allow him (due to a lack of energization of the bulb 71) to move the vehicle forwardly far enough for it to impact the obstacle.

It will be appreciated that the unit 81 need not be constructed as to its circuitry in the manner described above, but could also be constructed in other ways which will offer themselves to those skilled in the art. It will also be appreciated that the parking aid need not be operated with batteries, but could be operated on net current if an appropriate transformer is used which steps down the voltage to the voltage required by the light bulb, or if a light bulb is used which is compatible with the voltage supplied by the net current. Also, in place of one light bulb it would be possible to use two or more which are connected in parallel. For example, two light bulbs could be used which are connected in parallel and of which one produces a brighter light than the other, whereas the other produces a less bright light but has a longer lifetime so that even if the first bulb burns out the second one will continue to provide the required indication but, due to its less bright light, will also indicate that the first bulb has burned out and must be replaced.

Here, as in the other embodiments, an acoustical signal may be generated instead of an optical one. Again, the acoustical signal generator may be mounted in the housing 65, just as in the two preceding embodiments, or it may be located in some other position (it must of course then be connected with the parking aid by suitable conductors), for example it may be located laterally of the parking space so that the driver can more readily hear it.

Evidently, the parking aid according to the present invention can be used not only in connection with the wall of a garage, but in connection with any other kind of obstacle, for example walls of parking areas, posts, fences or the like.

While the invention has been illustrated and described as embodied in a parking aid for vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A parking aid for vehicles approaching an obstacle, particularly a wall of a garage, comprising signal generating means; and actuating means operatively connected with said signal generating means to trigger the same when contacted by an approaching vehicle, said actuating means comprising a resiliently mounted contact member coupled with said signal generating means, a feeler member having an upper part extending outwardly from the obstacle and a lower part extending vertically downwardly from said upper part, and a resilient spring having spaced end portions connected to said upper part of said feeler member and to said contact member, respectively.

2. A parking aid as defined in claim 1, said contact member having a substantially vertical orientation, and said spring being mounted on a lower portion of said contact member and extending transverse to the vertical orientation of the latter.

3. A parking aid as defined in claim 1, said feeler member being composed of at least two connected parts.

4. A parking aid as defined in claim 3, wherein said parts are telescoped into one another.

5. A parking aid as defined in claim 1, said signal generating means comprising an electric circuit including a switch having a stationary contact and a movable contact; and said contact member acting upon said movable contact and urging the same against said stationary contact in response to deflection of said feeler member in direction towards said obstruction under vehicle pressure.

6. A parking aid as defined in claim 1, said signal generating means comprising a light bulb; and further comprising a housing mounting said contact member and said signal generating means inclusive of said light bulb.

7. A parking aid as defined in claim 6, said signal generating means further including a plate located forwardly of said light bulb with respect to the approach direction of a vehicle, said plate having a light-permeable portion and a retroreflecting portion adjacent the same.

8. A parking aid as defined in claim 7, wherein said plate is a colored plate.

9. A parking aid as defined in claim 1; and further comprising means for varying the extent to which said feeler member can yield in direction towards the obstacle under vehicle pressure, before said signal generating means is actuated.

10. A parking aid as defined in claim 9, said signal generating means comprising an electrical circuit including a switch having a stationary contact and a movable contact; and wherein said varying means comprises means mounting said stationary contact for adjustment of the spacing thereof relative to said movable contact.

11. A parking aid as defined in claim 9, said signal generating means comprising an electrical circuit including a switch having a stationary contact and a movable contact defining a gap therebetween; and wherein said varying means comprises a disk turnable about an axis substantially parallel to the direction of movement of said movable contact, said disk being located at a side of said stationary contact facing away from said movable contact and having a plurality of circumferentially spaced axial projections of different lengths which are each individually engageable with said side to deflect said stationary contact toward said movable contact and thereby vary the width of said gap.

12. A parking aid as defined in claim 9, said varying means having a test position wherein said signal generating means can be triggered without yielding of said feeler member towards the obstacle.

13. A parking aid as defined in claim 1; and further comprising means for deactivating said signal generating means upon elapse of a predetermined time interval following the triggering thereof.

14. A parking aid as defined in claim 13, said deactivating means comprising a deactivating circuit including two contacts which engage one another in the non-deflected position of said feeler element.

15. A parking aid as defined in claim 14, said deactivating means further comprising a chargeable capacitor during the charging of which said signal generating means generates its signal, and said deactivating circuit further including a branch for short-circuiting said capacitor and having said two contacts interposed therein.

16. A parking aid as defined in claim 9, said signal generating means comprising an electrical circuit including a switch having two contacts, said varying means being operative for varying the spacing between said contacts in the non-actuated position of said signal generating means.

17. A parking aid as defined in claim 1; and further comprising means for deactivating said signal generating means upon elapse of a predetermined time interval following the triggering thereof, including a chargeable capacitor during the charging of which said signal generating means generates its signal, and a deactivating circuit including two contacts which engage one another in the non-deflected position of said feeler element and a branch for short-circuiting said capacitor and having said two contacts interposed therein.

* * * * *